United States Patent
Ribble

(10) Patent No.: US 8,206,600 B2
(45) Date of Patent: Jun. 26, 2012

(54) NANOIMPRINTING OF AN OPTIC TO CONTROL THE ETCH PATTERN ON ELECTROLYTIC CAPACITOR FOIL

(75) Inventor: Bruce Ribble, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 917 days.

(21) Appl. No.: 12/210,283

(22) Filed: Sep. 15, 2008

(65) Prior Publication Data
US 2010/0065529 A1    Mar. 18, 2010

(51) Int. Cl.
*H01G 4/00* (2006.01)
*H01G 5/00* (2006.01)
*H01G 7/00* (2006.01)
*H01G 9/00* (2006.01)
*H01G 13/00* (2006.01)

(52) U.S. Cl. .................. 216/6; 216/87; 216/94
(58) Field of Classification Search .................. None
See application file for complete search history.

(56) References Cited

U.S. PATENT DOCUMENTS

| | | |
|---|---|---|
| 3,622,843 A | 11/1971 | Vermilyea et al. |
| 3,872,579 A | 3/1975 | Papadopoulos |
| 4,266,332 A | 5/1981 | Markarian et al. |
| 4,474,657 A | 10/1984 | Arora |
| 4,518,471 A | 5/1985 | Arora |
| 4,525,249 A | 6/1985 | Arora |
| 4,541,037 A | 9/1985 | Ross et al. |
| 4,593,343 A | 6/1986 | Ross |
| 4,663,892 A | 5/1987 | Smith |
| 4,696,082 A | 9/1987 | Fonfria et al. |
| 5,522,851 A | 6/1996 | Fayram |
| 5,715,133 A | 2/1998 | Harrington et al. |
| 6,224,738 B1 * | 5/2001 | Sudduth et al. ............... 205/221 |
| 6,736,956 B1 * | 5/2004 | Hemphill et al. ............. 205/640 |
| 7,150,767 B1 | 12/2006 | Schneider et al. |
| 7,452,473 B1 * | 11/2008 | Hemphill et al. ................. 216/6 |
| 2005/0186405 A1 | 8/2005 | Jeong et al. |

OTHER PUBLICATIONS

"Laser-assisted nanopatterning of aluminum using particle-induced near-field optical enhancement and nanoimprinting" from Nanotechnology Nov. 2004.
"Fabrication of hemispherical cavity arrays on silicon substrates using laser-assisted nanoimprinting of self-assembled particles" from Nanotechnology Mar. 2004.
"From transparent particle light enhancement to laser nanoimprinting" from Journal of Laser Micro/Nanoengineering.

* cited by examiner

Primary Examiner — Duy Deo
(74) Attorney, Agent, or Firm — Steven M. Mitchell

(57) ABSTRACT

A method of etching a foil for use in an electrolytic capacitor utilizes a nanoimprinted optic to control the etch pattern. The optic is formed by creating a self-assembled monolayer (SAM) of hemispheres onto the surface of an optical quartz substrate. A laser is directed onto the optic while the foil underlies the optic, and the concentrated light source is used to effectively image an array of submicron spots. The resulting spots allow for controlled initiation of etch tunnels during a subsequent electrochemical etch of the foil, with the purpose of ultimately increasing foil capacitance through the increased surface area.

20 Claims, 1 Drawing Sheet

NANOIMPRINTING OF AN OPTIC TO CONTROL THE ETCH PATTERN ON ELECTROLYTIC CAPACITOR FOIL

BACKGROUND OF THE INVENTION

1. Field of the Invention

The present invention is directed to the etching of metal foil for use in electrolytic capacitors and more particularly to a method of controlling the etch pattern on an electrolytic capacitor foil used in implantable cardioverter defibrillators (ICDs).

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an implantable cardioverter defibrillator (ICD), also referred to as an implantable defibrillator, since the high voltage capacitors used to deliver the defibrillation pulse can occupy as much as one third of the ICD volume.

Electrolytic capacitors are used in ICDs because they have the most near ideal properties in terms of size and ability to withstand relatively high voltage. Conventionally, an electrolytic capacitor includes an etched aluminum foil anode, an aluminum foil or film cathode, and an interposed kraft paper or fabric gauze separator impregnated with a solvent-based liquid electrolyte. The electrolyte impregnated in the separator functions as the cathode in continuity with the cathode foil, while an oxide layer on the anode foil functions as the dielectric. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, composing a planar, layered, stack structure of electrode materials with separators interposed therebetween.

Since these capacitors must typically store approximately 30-40 joules, their size can be relatively large, and it is difficult to package them in a small implantable device. Currently available ICDs are relatively large devices (over 30 to 40 cubic centimeters (cc)), generally about 12-16 millimeters (mm) thick. A patient who has a device implanted may often be bothered by the presence of the large object in his or her pectoral region. For the comfort of the patient, it is desirable to make smaller ICDs. The size and configuration of the capacitors contribute 9 to 12 cc of the ICD volume.

In ICDs, as in other applications where space is a critical design element, it is desirable to use capacitors with the greatest possible capacitance per unit volume. Since the capacitance of an electrolytic capacitor increases with the surface area of its electrodes, increasing the surface area of the aluminum anode foil results in increased capacitance per unit volume of the electrolytic capacitor. By electrolytically etching aluminum foils, an enlargement of a surface area of the foil will occur. As a result of this enlargement of the surface area, electrolytic capacitors, which are manufactured with the etched foils, can obtain a given capacity with a smaller volume than an electrolytic capacitor which utilizes a foil with an unetched surface.

Etching the foil increases the surface area of the foil. A metal foil may be etched according to any method that increases the surface area, such as electrochemical etching, roughing the foil surface mechanically and chemical etching. Electrochemical etching increases the surface area of the foil by electrochemically removing portions of the foil to creates etch tunnels. Electrochemical etching is done according to any known etch process, such as the ones discussed in U.S. Pat. Nos. 4,474,657; 4,518,471; 4,525,249 and 5,715,133 which are incorporated herein by reference.

In a conventional electrolytic etching process, surface area of the foil is increased by removing portions of the aluminum foil to create etch tunnels. The foil used for such etching is typically an etchable aluminum strip of high cubicity. The etch initiation and hence the gain or capacitance of the foil is the result of several variables, such as foil cubicity, thermal oxide on the foil, and the electrochemical reaction. Research indicates that the capacitance can be raised by 2.5 to 3 times if the etch tunnels were arrayed periodically to achieve maximum theoretical surface area. Thus, increased surface area equates to a reduction in capacitor volume from 50-66% which in terms of current ICD volume is a 3 to 4.5 cc reduction.

The ideal etching structure is a pure tunnel-like etching with defined and uniform tunnel diameters and without any undesirable pitting of the foil. As tunnel density (i.e., the number of tunnels per square centimeter) is increased, a corresponding enlargement of the overall surface area will occur. Larger surface area results in higher overall capacitance. However, high gain etching of valve metals for use as anodes in electrolytic capacitors tend to produce very brittle anode foil. Typically the higher the gain of the anode foil, the more brittle the foil. In particular, the brittleness of the foil and its capacitance are both proportional to the depth of the etching and the density of the etch pits, i.e., the number per unit area. Accordingly, the capacitance and thereby the energy density are limited by the brittleness of the formed foil. As the brittleness of the formed foil increases, cracks formed in the foil more easily propagate across the foil, resulting in broken anodes.

Creating a pattern on an aluminum foil surface has been previously demonstrated as a means to successfully increase surface area. For example, U.S. Pat. No. 7,150,767 to Schneider, et al., which is incorporated herein by reference in its entirety, discloses an etching process which applies a holographic image to a photoresist coated on a foil to create a pattern of photoresist on the foil prior to etching. The photoresist pattern on the foil surface allows for positional control of tunnel initiation. Alternatively, U.S. Pat. No. 6,224,738 to Sudduth, et al. and U.S. Pat. No. 6,736,956 to Hemphill et al., which are incorporated herein by reference in their entirety, disclose etching processes which utilize masking to control tunnel initiation. By controlling the position of tunnel initiation, foils are etched more uniformly and have optimum tunnel distributions. This allows for the production of highly etched foils that maintain high strength and have high capacitance. The difficulty arises, however, in attempting to control the pattern on a 1 micron scale. There is a need therefore for a process of etching foil for use in electrolytic capacitors which allows for positional control of tunnel initiation on a micron level.

SUMMARY OF THE INVENTION

Disclosed herein is a method for etching a foil for use in an electrolytic capacitor including the steps of placing a nanoimprinted optic in close proximity to said foil; illuminating said nanoimprinted optic with a light source, wherein said nanoimprinted optic focuses light passing therethrough onto a surface of said foil to create an array of submicron spots on said foil; and etching said foil, wherein said array of submicron spots controls initiation of etch tunnels.

Also disclosed herein is a method for etching a foil for use in an electrolytic capacitor including the steps of placing a nanoimprinted optic in close proximity to said foil; illuminating said nanoimprinted optic with a light source, wherein said nanoimprinted optic focuses light passing therethrough onto a surface of said foil to create an array of spots on said foil, wherein each of said spots has a diameter not greater than about 1 micron; and etching said foil, wherein said array of spots controls initiation of etch tunnels.

Further disclosed herein, is method for etching a foil for use in an electrolytic capacitor including the steps of forming a nanoimprinted optic; placing said nanoimprinted optic in close proximity to said foil; illuminating said nanoimprinted optic with a laser, wherein said nanoimprinted optic focuses laser light passing therethrough onto a surface of said foil to create an array of spots on said foil; and etching said foil, wherein said array of spots controls initiation of etch tunnels.

In one embodiment, the nanoimprinted optic is formed by a process including dissolving silica particles into a liquid to create a suspension; angling a surface of an optical quartz substrate; and applying said suspension to said angled substrate to create a self-assembled monolayer on a surface of said substrate.

BRIEF DESCRIPTION OF THE DRAWINGS/FIGURES

The accompanying drawings are incorporated herein and form part of the specification. Together with the detailed description, the drawings further serve to explain the principles of and to enable a person skilled in the relevant art(s) to make and use the devices presented herein.

DETAILED DESCRIPTION OF THE INVENTION

Figure 1:
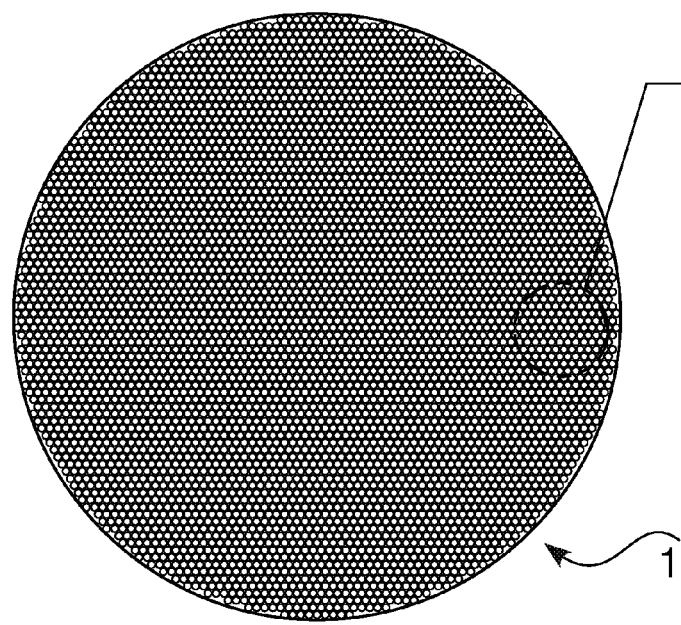
FIG. 1 illustrates a nanoimprinted optic comprising an array of submicron spots on an aluminum capacitor foil that will be used to control etch initiation.

Electrochemical etching of metal foil increases foil surface area and increases anodic foil capacitance. The aluminum anode material typically used in electrolytic capacitors employed in implantable cardioverter defibrillators (ICDs) is created using an electrochemical etch process. During the etching process tunnels are formed, by the electrochemical dissolution of metal from the foil, in the [100] direction, thereby increasing overall foil surface area. It is critical to control the morphology of the tunnels and their distribution, as the tunnels dictate the increase in surface area and capacitance. Tunnel morphology depends on the etch solution, etch temperature, current density, and many other factors known by those skilled in the art. However, the tunnel distribution after conventional etching processes is not uniform.

Currently, etch initiation and hence the gain or capacitance of the foil is the result of several variables such as foil cubicity, thermal oxide on the foil and the electrochemical reaction. Research indicates that the capacitance can be raised by 2.5 to 3 times if the etch tunnels are arrayed periodically to achieve maximum theoretical surface area. This equates, in theory, to a reduction in capacitor volume from 50-66%, which in terms of current ICD volume is a 3 to 4.5 cc reduction.

The present invention seeks to improve upon prior etching techniques by first creating an nanoimprinted optic that is then used to image a pattern of submicron spots on the foil to control the initiation of etch tunnels. Creating a pattern on a foil is one method that has been successfully demonstrated and previously disclosed. However, controlling the pattern on a 1 micron scale has previously been problematic.

As disclosed herein, by overlaying the foil with an nanoimprinted optic and applying a collimated light source, an array of submicron spots can be created on the foil to effectively control the initiation of etch tunnels. The foil then undergoes a known etch process. After the etching process, the resulting increased surface area on the foil raises capacitance, and consequently allows for reduced capacitor volume. A foil etched according to the present invention may be used in an electrolytic capacitor, such as an electrolytic capacitor typically employed in ICDs.

Preferred embodiments of the present invention are now described. While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The method of the present invention involves the formation of an optic that is illuminated in close proximity to a capacitor foil to create a pattern of submicron spots on the foil. By illuminating the foil through the optic with a laser or suitable light source, the object is to form 1 micron etch pits in the foil. The foil then undergoes a subsequent electrochemical etching process, wherein the etching is controlled through the pattern that was formed on the foil surface.

The method requires first creating optic 10 to be illuminated in combination with capacitor foil 20. FIG. 1 is a plan view of an exemplary nanoimprinted optic 10. In one embodiment, the formation of optic 10 begins by dissolving monodispersed spheres of silica into a liquid, preferably water, to create a suspension. The silica spheres should be approximately 1 micron (μm) in diameter. An optically polished quartz blank is prepared and the suspension is applied to the surface of the optical quartz substrate as it is titled at an angle of approximately 45 degrees, in order for the array of hemispheres to form a self-assembling monolayer (SAM). The monolayer is nanoimprinted by heating the quartz substrate, applying pressure and illuminating with a laser pulse. In one embodiment, the quartz substrate with the self-assembled monolayer is pressed against a blank quartz substrate to sandwich the monolayer. A light source, such as a high-powered laser beam, is then directed towards the quartz/monolayer/quartz structure, nanoimprinting the silica particles onto the substrates. Other techniques for forming the monolayer and/or nanoimprinting may be used as would be apparent to one of ordinary skill in the art.

Figure 2:
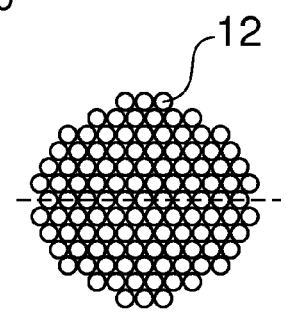
FIG. 2 illustrates a detailed view of one embodiment of the hemispheres arrayed on an area of the optic in FIG. 1.

The two quartz substrates are then separated, resulting in two quartz optics 10 each having an array of nanoimprinted hemispheres. The hemispheres have diameters of approximately 1 micron and are arrayed on approximately 1.25 to 1.5 micron centers. Any remaining silica particles on the optic surfaces can be removed in a cleaning process. This optic then undergoes a final polish. The hemispheres 12, illustrated in the embodiment of FIG. 2, have diameters of approximately 1 micron and are arrayed on approximately 1.25 to 1.5 micron centers. Other techniques may also be employed, as would be apparent to one of ordinary skill in the art, to create a nanoimprinted optic.

Figure 3:
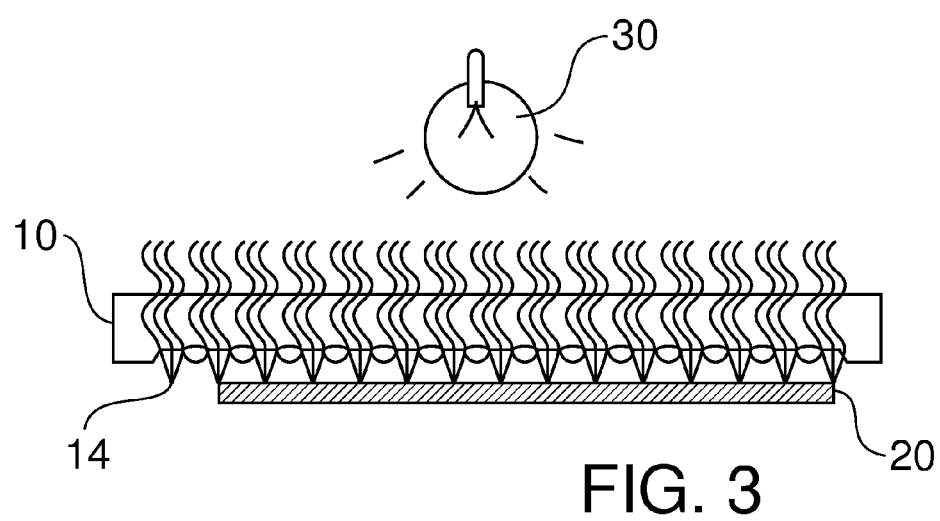
FIG. 3 illustrates the process of illuminating a nanoimprinted optic overlying an aluminum capacitor foil using a light source.

The next stage involves placing optic 10 in close proximity to aluminum capacitor foil 20. FIG. 3 illustrates a system for illuminating a nanoimprinted optic 10 overlying capacitor foil 20, preferably comprised of aluminum. After optic 10 is created, as previously discussed, optic 10 is placed in proximity to capacitor foil 20.

Foil 20 may be made from any electrically conductive material. According to the present invention, the etched foil may be used as an electrode in a capacitor, such as an anode or alternatively as a cathode. Anode and cathode foils may be made of metal, metal alloy, or a metal composite material, for example aluminum. Aluminum foils are well known in the art and are commercially available. In one example, the foil is aluminum with purity of at least about 99.96%, preferably about 99.98-99.99%, aluminum and at least about 80% cubic texture, and has thickness of about 50-200 μm, preferably about 110 μm. Alternative materials include, but are not limited to, zinc, zirconium, tantalum, magnesium, niobium, and alloys of any or all of these metals.

Optic 10 is subsequently illuminated with an appropriate light source, such as a photon source, preferably with a collimated UV lamp, or an appropriate laser source 30. Focal plane 14 of optic 10 is positioned over capacitor foil 20 so that the illumination creates an array of spots on the foil wherein each of the spots has a diameter of not greater than about 1 micron with about 1.25 to about 1.5 micron centers. Nanoimprinted optic 10 converts laser source 30 into numerous minute focal points which in turn rapidly fabricate tiny spots over the designated area on capacitor foil 20. Essentially, cracks are formed where hemispheres focus the light. The resulting patterned image of spots is used to control etch initiation in a subsequent electrochemical etching process. The etching on the foil surface is selectively advanced in areas where the pattern exists.

A laser or light source 30 is directed at optic 10 to form spots (also referred to herein as cracks or pits) in foil 20 at locations where the hemispheres focus the light source 30. The illumination creates spots that penetrate the oxide surface on aluminum capacitor foil 20. The laser or light source 30 generates heat that causes bulk high cubicity aluminum to melt, and upon cooling, to solidify into low cubicity aluminum. Solidify is utilized herein to mean the transition in the physical state of the foil from a melted liquid to a solid as the foil cools. The final solid state may be either crystalline, amorphous, or a mixture of the two. Elevated regions are formed around the spots, cracks, or pits as the laser or light source 30 pushes aluminum to the side of the focal points of illumination during the illumination process. As the illuminated foil cools and resolidifies, low cubicity aluminum pulls away from high cubicity aluminum and the spots, cracks, or pits are formed that expose fresh foil surface. Spot, crack, or pit is used herein to mean the portion of the foil where the light illuminates and melts the foil to expose fresh foil surface. Fresh foil surface differs from the bulk foil surface in that the fresh foil surface has less or no aluminum oxide coating the surface. The resulting image or pattern is used to control etch initiation in a subsequent process of electrochemical etching.

The foil is etched according to any method that increases the surface area, preferably electrochemical etching, as is known to one skilled in the relevant art. Other methods include, but are not limited to, roughing the foil surface mechanically and chemical etching. Electrochemical etching increases the surface area of the foil by electrochemically removing portions of the foil to create etch tunnels.

In a preferred embodiment, the anode foil is etched in an aqueous halide based etch solution, preferably a hydrochloric acid or sodium chloride solution, according to a conventional etch process; for example, U.S. Pat. No. 5,715,133 to Harrington et al. describes a suitable method of etching foil and is incorporated herein by reference in its entirety. The etch solution preferably consists of about 1.5% by weight sodium chloride, about 3.0% by weight sodium perchlorate, about 3% by weight glycerin, 0.5% by weight sodium sulfate, and deionized water. The etch solution preferably is heated to a temperature in the range of about 60° C. to about 95° C., preferably 85° C. The foil is etched at a DC current density of about 0.01 A/cm$^2$ to about 0.50 A/cm$^2$, preferably about 0.15 A/cm$^2$. A charge of about 15 coulombs/cm$^2$ to 100 coulombs/cm$^2$, preferably about 30 coulombs/cm$^2$, is passed through the foil during the etching process, which requires an etch time in the range of about 2 minutes to about 12 minutes.

After etching, the foil is further processed in a combination of optional steps such as widening, forming and finishing steps.

For example, after etching, the foil is removed from the etch solution and rinsed in deionized water. The tunnels formed during the initial etch are then widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. No. 4,518,471 and U.S. Pat. No. 4,525,249, both of which are incorporated herein by reference.

After the etch tunnels have been widened, the foil is again rinsed with deionized water and dried. Finally, a barrier oxide layer is formed onto one or both surfaces of the metal foil by placing the foil into an electrolyte bath and applying a positive voltage to the metal foil and a negative voltage to the electrolyte. Preferably, the dielectric oxide layer is grown anodically in an aqueous formation electrolyte, with a minimum voltage that is 10% greater than the intended working voltage of the finished capacitor. The barrier oxide layer provides a high resistance to current passing between the electrolyte and the metal foils in the finished capacitor, also referred to as the leakage current. High leakage current can result in the poor performance and reliability of an electrolytic capacitor. In particular, high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100-1000 μS/cm, preferably 500 μS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt.

The etched and formed anode foils are cut and the capacitor is assembled. It is understood to one of ordinary skill in the art that additional steps, or an alternative combination of steps, can be used in processing an etched anode foil. Additional steps include, but are not limited to rinsing, drying, hydrating, capacitance testing, annealing, and capacitor assembling. These steps can be carried out using any method known to one skilled in the art.

The invention also includes an etched anode foil produced by the methods described above. Anode foils are punched from etched anode sheets. Foil sheets etched in accordance with the present invention and the resulting anode foils exhibit high capacitance while maintaining high strength.

In another embodiment, the present invention relates to an electrolytic capacitor comprising etched aluminum anode foils, which have been prepared using the methods of the present invention. Such capacitors can be made using any suitable methods known in the art. Non-limiting examples of such methods are disclosed, e.g. in the following references: U.S. Pat. Nos. 4,696,082 to Fonfria et al., 4,663,892 to Kenmochi, 3,872,579 to Papadopoulos, 4,541,037 to Ross et al., 4,266,332 to Markarian et al., 3,622,843 to Vermiyea et al., and 4,593,343 to Ross, each of which is incorporated herein by reference.

Electrolytic capacitors manufactured with anode foils etched according to the present invention may be utilized in ICDs, such as those described in U.S. Pat. No. 5,522,851 to Fayram, incorporated herein by reference. The increased capacitance per unit volume of the electrolytic capacitor will allow for a reduction in the size of the ICD.

While the invention has been particularly shown and described with reference to preferred embodiments thereof, it will be understood by those skilled in the art that various changes in form and details may be made therein without departing from the spirit and the scope of the invention.

What is claimed is:

1. A method for etching a foil for use in an electrolytic capacitor, the method comprising the steps of:
    (a) placing a nanoimprinted optic in close proximity to said foil;
    (b) illuminating said nanoimprinted optic with a light source, wherein said nanoimprinted optic focuses light passing therethrough onto a surface of said foil to create an array of submicron spots on said foil; and
    (c) etching said foil, wherein said array of submicron spots controls initiation of etch tunnels.

2. The method of claim 1, wherein said tunnel initiation is promoted near said submicron spots.

3. The method of claim 1, wherein said light source is selected from the group consisting of a laser, a collimated UV lamp, and a photon source.

4. The method of claim 1, wherein said nanoimprinted optic is formed by a process comprising:
    (a) dissolving silica particles into a liquid to create a suspension,
    (b) angling a surface of an optical quartz substrate, and
    (c) applying said suspension to said angled substrate to create a self-assembled monolayer on a surface of said substrate.

5. The method of claim 4, wherein said particles comprise mono-dispersed spheres having diameters of approximately 1.0 micron.

6. The method of claim 5, wherein said particles are arrayed on approximately 1.25 to 1.5 micron centers.

7. The method of claim 5, wherein said surface is angled at about 45 degrees.

8. The method of claim 5, further comprising pressing a blank quartz plate against said quartz substrate having said self-assembled monolayer.

9. The method of claim 8, wherein said quartz substrate and said blank quartz plate are nanoimprinted by applying a light source thereto, forming an array of imprinted hemispheres on both of said surfaces.

10. The method of claim 9, wherein said light source is one of a collimated UV lamp or a laser.

11. The method of claim 9, wherein after nanoimprinting, said quartz substrates are separated, resulting in two of said optics.

12. The method of claim 11, wherein said optics are cleaned to remove any remaining silica particles.

13. The method of claim 9, wherein said hemispheres are arrayed on approximately 1.25 to 1.5 micron centers.

14. The method of claim 1, wherein said foil comprises an aluminum anode.

15. The method of claim 1, wherein said etched foil may be used as an anode electrode in a capacitor.

16. The method of claim 1, wherein said etched foil may be used as cathode electrode in a capacitor.

17. The method of claim 1, wherein the foil has an oxide layer and said array of submicron spots penetrate the oxide layer in the region of each spot.

18. The method of claim 1, wherein less oxide coats the surface of said foil at each of said spots as compared to the bulk foil.

19. A method for etching a foil for use in an electrolytic capacitor, the method comprising the steps of:
    (a) forming a nanoimprinted optic by a process comprising:
        (1) dissolving silica particles into a liquid to create a suspension;
        (2) angling a surface of an optical quartz substrate; and
        (3) applying said suspension to said angled substrate to create a self-assembled monolayer on a surface of said substrate;
    (b) placing said nanoimprinted optic in close proximity to said foil;
    (c) illuminating said nanoimprinted optic with a laser, wherein said nanoimprinted optic focuses laser light passing therethrough onto a surface of said foil to create an array of spots on said foil; and
    (d) etching said foil, wherein said array of spots controls initiation of etch tunnels.

20. A method for etching a foil for use in an electrolytic capacitor, the method comprising the steps of:
    (a) placing a nanoimprinted optic in close proximity to said foil;
    (b) illuminating said nanoimprinted optic with a light source, wherein said nanoimprinted optic focuses light passing therethrough onto a surface of said foil to create an array of spots on said foil, wherein each of said spots has a diameter not greater than about 1 micron; and
    (c) etching said foil, wherein said array spots control initiation of etch tunnels.

* * * * *